Oct. 17, 1961
C. F. ROSENBLAD
3,004,590
MULTIPLE EFFECT EVAPORATORS
Filed April 15, 1957
4 Sheets-Sheet 4
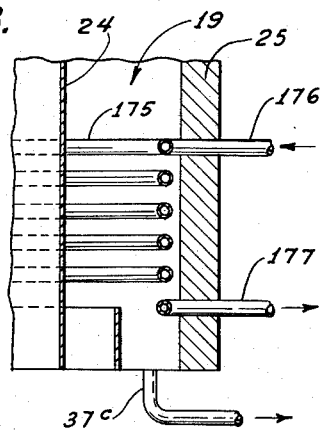
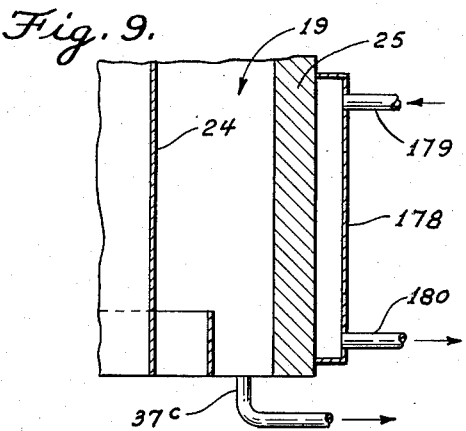
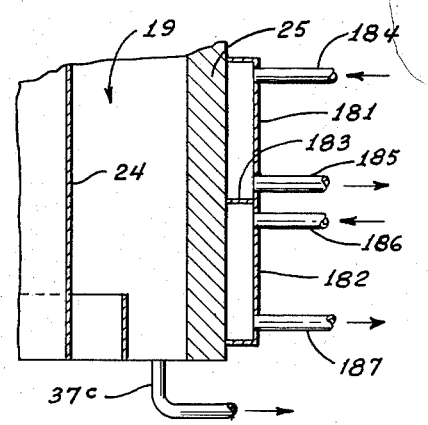
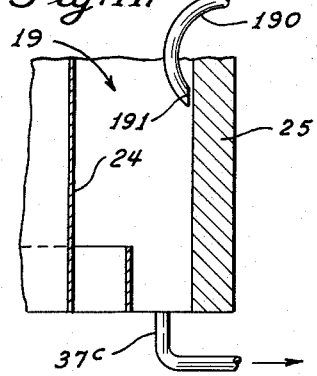
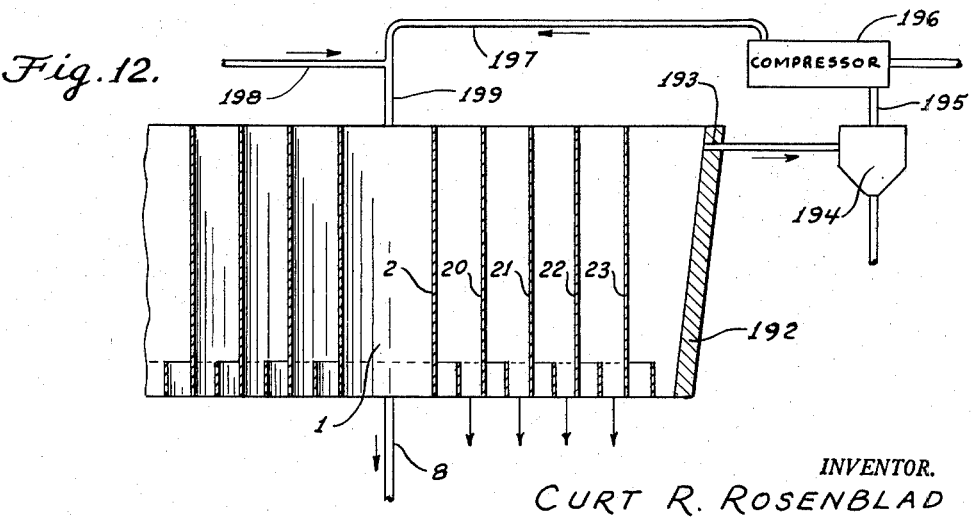
INVENTOR.
CURT R. ROSENBLAD
BY
Albert M. Parker
ATTORNEY.

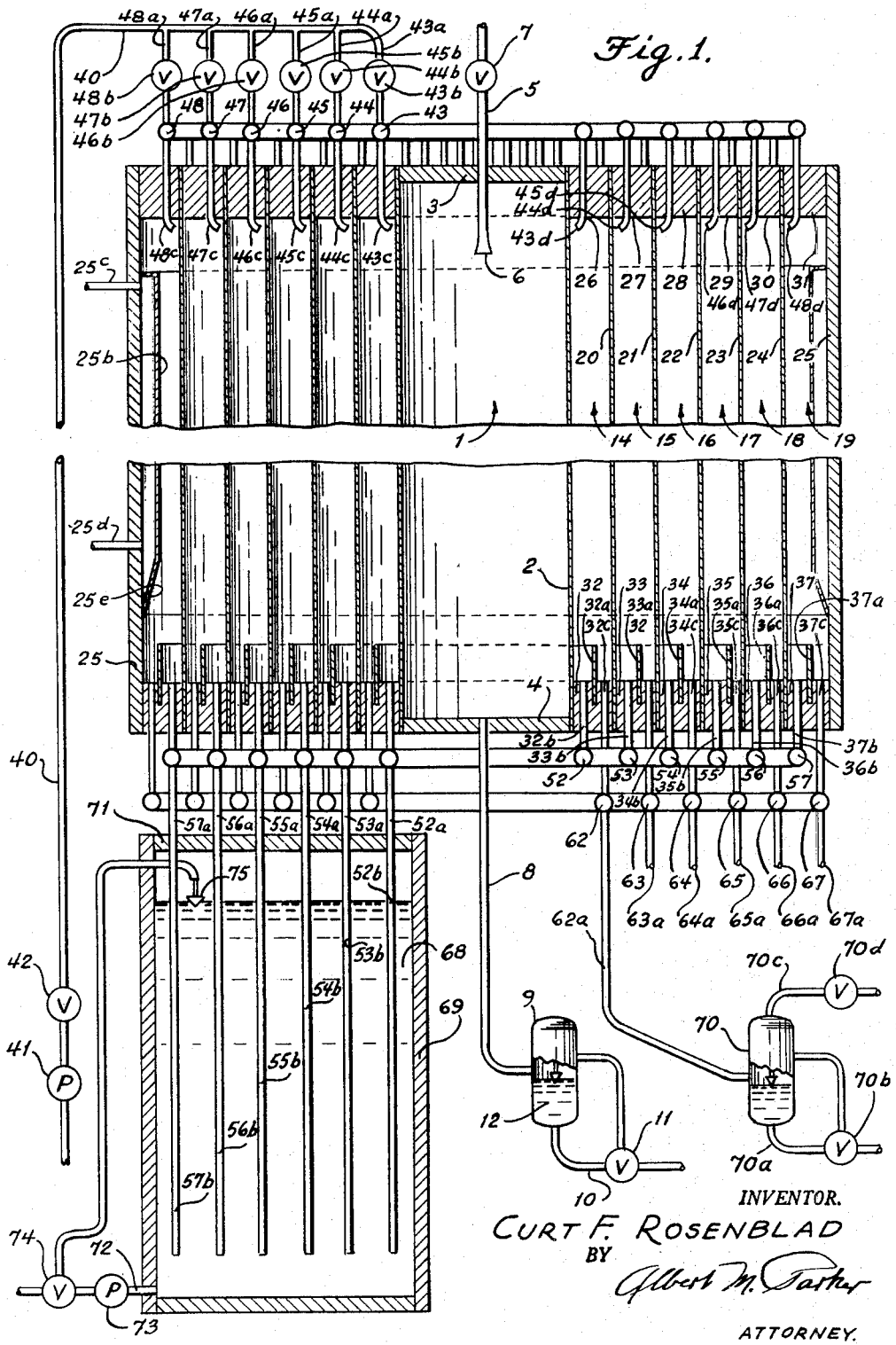

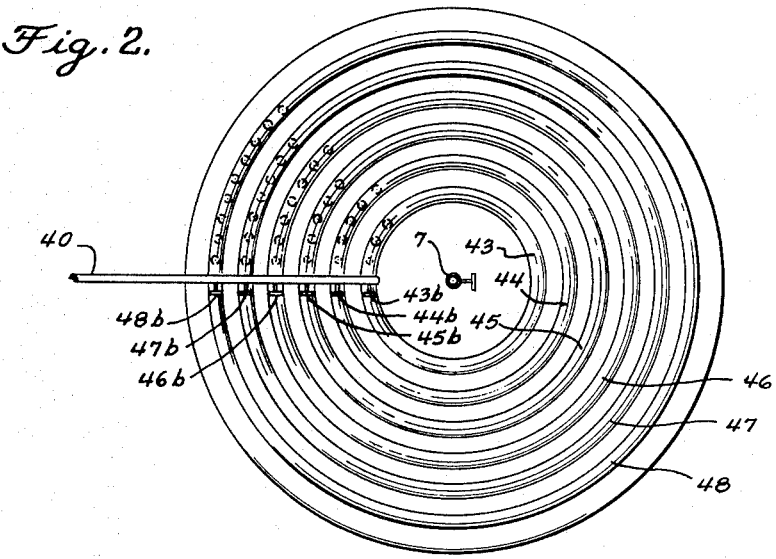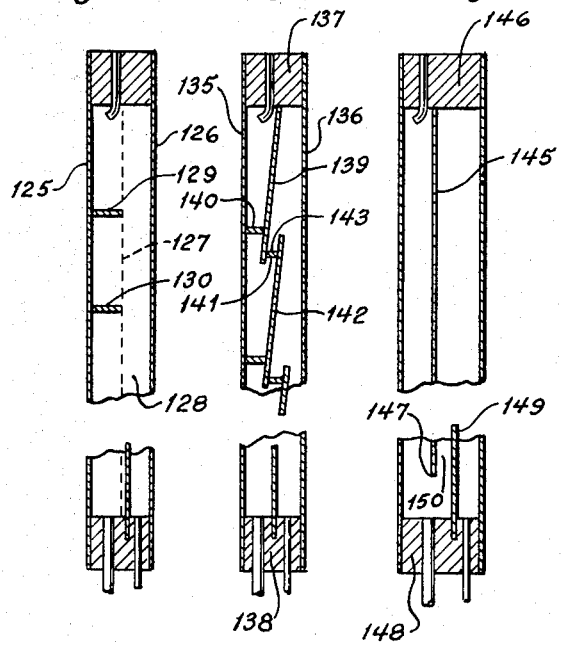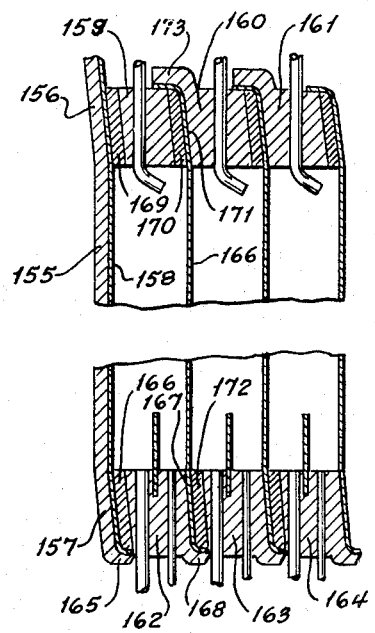

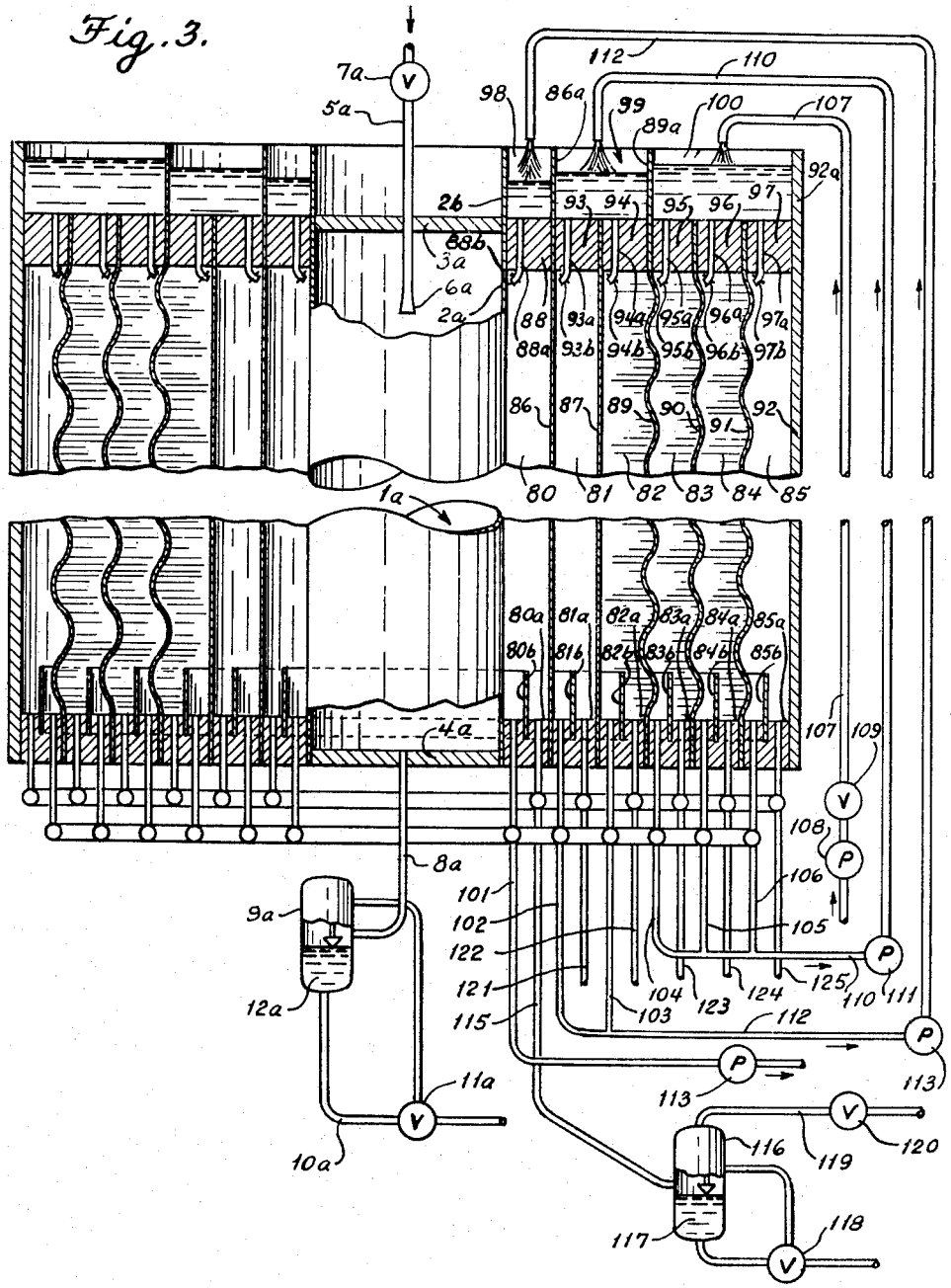

United States Patent Office 3,004,590
Patented Oct. 17, 1961

3,004,590
MULTIPLE EFFECT EVAPORATORS
Curt F. Rosenblad, Princeton, N.J. (% Rosenblad Corp., 1270 6th Ave., New York 20, N.Y.)
Filed Apr. 15, 1957, Ser. No. 652,779
4 Claims. (Cl. 159—13)

This invention relates to multiple effect evaporators and is particularly concerned with such evaporators where evaporation is effected from a falling film of fluid. This application is a continuation in part of my co-pending application Serial No. 644,612, filed March 7, 1957, now abandoned.

Generally speaking, the evaporator of the invention consists of a number of concentrically arranged vertical cylinders. The innermost of these cylinders receives the heating medium which heats the wall thereof and thus causes evaporation of the fluid in film-like form, flowing down the opposite side of that wall. The velocity within the effects is low since the vapor just goes from one surface of the effect across to the other. These vapors serve to heat the opposite wall of the concentric chamber and in doing so are themselves condensed to flow down that wall. This action continues from effect to effect, or, in other words, from one concentric annular cylinder to the next outer one, etc., to the total number of effects desired.

In each effect, or annular vertically extending evaporation chamber, concentrated liquid which has been heated to drive off vapors flows down the inner or hotter wall, while the condensate from those vapors, after heating the outer wall, condenses on it and flows down. Thus concentrated liquor and condensate can readily be collected separately and drawn off at the bottom of the effect.

This construction has many advantages over prior art multiple effect evaporators. From the structural standpoint it is of the utmost simplicity. The cylindrical formation provides its own structural strength. There are no corners to join and seal, the only sealing being between the cylinders and their top and bottom spacer rings. Even after the assembly has been in use, additional cylinders, and consequently additional effects, can be added merely by moving the outer shell, adding on the cylinders and providing a new outer shell. Likewise the number of cylinders can be reduced if desired.

The dividing walls between the effects being cylinders, they are strongly resistant to distortion due to pressure differences. In addition to this, there is not much pressure differential acting upon them, for with a reasonable number of effects, the pressure difference between each effect is small. Preferably, the evaporator would be set to operate with the highest pressure and temperature being in the innermost effect. There would only be a moderate pressure and temperature for the next effect. The same would continue on out to the outermost cylindrical chamber or effect. It is also to be noted that the evaporator of the invention can have a substantially greater number of effects than what is presently considered as the normal maximum. That maximum is normally considered as seven, whereas the invention construction can go up to twice that number of effects.

So long as the outermost shell is of sufficient strength to provide adequate support, the walls separating the various effects can be of lighter weight material than heretofore considered possible. Actually they can even be of canvas or other soft material. Also, though a cylindrical formation is preferred, the walls could be somewhat elliptical if desired, and for certain purposes the evaporator could be made up of nested concentric conical elements.

The feed to and withdrawal of condensate and product from the evaporator of the invention can be carried out in simple and effective manner by employing annular headers, which may even be of an open tank type if the inlet side is operating at atmospheric pressure. Furthermore, the evaporator may be operated with all the effects in parallel, with all of them in series, or with various combinations of series and parallel, as may be desired.

The evaporator of the invention is extremely effective. For one thing there is no pressure drop in transferring vapor from the liquor surface in one effect to the heating surface in the next effect. Then again, there are no appreciable radiation losses for each effect surrounds the one before it and any radiant heat is utilized within the construction itself to assist in the functioning of the evaporator.

Moreover, evaporators constructed in accordance with the invention can be readily and effectively cleaned of scale merely by running water, or a suitable cleaning material, down the walls of the various effects.

It is, of course, also to be understood that such evaporators can be employed either for the concentration of liquor by the driving off of vapor therefrom, or, in reverse, for the collection of condensate of the vapors driven off. Also it can be used as a separator of materials making up the initial fluid.

It is, accordingly, the principal object of the invention to improve upon multiple effect evaporators.

Another object is to simplify the construction of such evaporators while maintaining adequate strength and full effectiveness thereof.

Another object is to provide multiple effect evaporators of improved efficiency.

Still another object is to provide for the making of such evaporators having a greater number of effects than heretofore thought possible.

A further object is to make such evaporators out of lighter weight and a greater range of materials than has heretofore been thought possible.

A still further object is to provide evaporators which may have effects added thereto or removed therefrom at any time.

Still further objects are to provide for the more effective utilization of heat in multiple effect evaporators to prevent heat losses therefrom and to eliminate drop in pressure from one effect to the next.

A more detailed object of the invention is to provide multiple effect evaporator constructions which can be readily set up for parallel feeding, series feeding, or combinations thereof.

Further and more detailed objects will in part be obvious and in part be pointed out as the description of the invention taken in conjunction with the accompanying drawing proceeds.

In that drawing:

FIG. 1 is a vertical section of an evaporator in accordance with the invention.

FIG. 2 is a top plan view thereof.

FIG. 3 is a view similar to FIG. 1 showing a somewhat modified form of an evaporator.

FIGS. 4, 5 and 6 are fragmentary vertical sections of effects from evaporators in accordance with the invention incorporating baffles for keeping the product and condensate separated.

FIG. 7 is a fragmentary vertical section of a modified evaporator construction in accordance with the invention.

FIGS. 8–11 are similar fragmentary vertical sections of a portion of the last effect of an evaporator in accordance with the invention, showing a portion of the shell and including various alternatives for cooling and condensing the vapors in the last effect, and FIG. 12 is a fragmentary vertical section of so much of a complete evaporator as is necessary to illustrate a system for the removal of vapor from the last effect and the compressing of the same for use in the initial heating.

The invention in a most simple form is embodied in the showing in FIG. 1. Starting with the inner cylinder, generally indicated at 1, that will be seen to have a cylindrical side wall 2 of heat transmissive material, closed at its ends by the top 3 and the bottom 4. A pipe 5 extends through the top 3 for the admission of steam into the cylinder 1 out of a suitable nozzle 6. Control of the flow of steam in the pipe 5 is effected by the valve 7. A pipe 8 extends through the bottom 4, preferably terminating flush with the inner surface thereof, for taking off condensate formed in the cylinder 1. The condensate outlet pipe 8 is connected to a condensate remover 9 from which the condensate is run off through the pipe 10 under control of the valve 11, action of which valve is preferably controlled by the level of the liquid 12 in the remover 9. This condensate may be just let down the drain, or may, if desired, be returned to the steam generation system, passed through a heat exchanger, or otherwise employed in the best interests of economy.

The cylinder 1 is surrounded by a plurality of annular cylindrical evaporation chambers making up the "effects" of the evaporator, generally indicated at 14, 15, 16, 17, 18 and 19, concentric with each other and with the cylinder 1. The first of these chambers 14 is bordered at its inner side by the wall 2 and at its outer side by its own heat transfer wall 20. The wall 20 in turn forms the inner border of the chamber 15 whose outer border is formed by the heat transfer wall 21. The same situation prevails for the remaining chambers 16—19 which are bordered interiorly by the exterior wall of the preceding chamber and exteriorly by their own walls 22, 23, 24 and 25. The wall 25, however, being the exterior wall or shell of the assembly, is of heavier construction, as it forms the supporting wall for the assembly. This wall is preferably suitably cooled or provided with a suitable cooling jacket in order to condense the vapors produced in this effect if it is desired that they be taken off in liquid form.

In the present instance such cooling is illustrated as being effected by means of an annular internal jacket 25b applied to the inner surface of the wall 25 and extending throughout a substantial portion of the height thereof, as well as continuing around the periphery thereof. This jacket has an inlet 25c for a cooling fluid and outlet 25d therefor. There may, of course, be a plurality of these inlets and outlets around the periphery of the shell and the flow can be reversed if desired, with the inlet at 25d and the outlet at 25c. Also, the wall of the jacket is preferably inclined outwardly at its lower end, as indicated at 25e, to facilitate flow of the condensate down the outer surface thereof to its proper outlet.

The chambers 14—19 are suitably closed at their tops by the ring members 26—31 respectively, and at their bottoms by the ring members 32—37 respectively, of a somewhat different construction from the ring members 26—31.

It will be understood, of course, the number of six (6) effects as here shown is purely arbitrary and for the purposes of illustration. As already pointed out, a substantially greater number can be provided as desired. On the other hand, a lesser number can be employed.

The cylindrical walls 2 and 20—24 may well be of lighter weight heat transmissive sheet material than employed in heretofore known other types of evaporators. Where they are of light weight this is made possible by the fact that they are cylindrical and concentric and provide the walls for effects between which the pressure drop is relatively small. The walls 2 and 20—24 may be suitably secured as by welding, or otherwise, in leak-tight engagement with the rings 26—31 and 32—37 respectively.

All of the effects of this evaporator operate in the same manner, merely with differences in temperature and pressure from the steam side outwardly. Considering the showing in FIG. 2 along with that of FIG. 1, it will be seen that a single feed line 40 carries feed from a suitable source by the action of the pump 41 and under control of the valve 42 to a plurality of annular headers 43—48 numbered from the innermost outwardly. These headers are fed from the single feed conduit 40, through branch pipes 43a—48a respectively, and the feed is under the control of a series of valves 43b—48b respectively in the pipes 43a—48a.

The function of the valves 43b—48b is of particular significance, for it is desired to have a uniform flow of the fluid to be evaporated in film-like form down the inner walls of each of the evaporation chambers. Control of the flow can be achieved in various ways, one of which would be to vary the outlet orifices of the nozzles directing the fluid against the wall. What is done here, however, is to employ uniform nozzles throughout and control the flow to the headers for the nozzles by the valves 43b—48b. It is also to be understood that such valves may either be manually settable, or be automatically operable. In any event, there should be uniform distribution of the fluid to be evaporated onto the evaporating surface and more specifically this should be a constant flow, which may be expressed in terms of gallons per horizontal foot of evaporating surface.

As just indicated, the flow of fluid from the headers 43—48 on to the convex surfaces of the walls 2 and 20—24 is effected by nozzles, here indicated at 43c—48c, extending respectively through the top closing rings 26—31 and terminating in inturned orifices 43d—48d to project the flow of liquid against those convex surfaces. There will, of course, be a plurality of nozzles extending into each chamber from the respective annular headers and preferably the nozzles for each chamber will be spaced a uniform distance apart, regardless of the circumference of the chamber. In this way uniform flow of fluid down the heating wall is provided. The convex surfaces of the walls 2 and 20—24 may advantageously be covered by a liquid absorbent material like cloth to secure a good distribution with a minimum of feed.

The bottom portion of each chamber 14—19 is divided into inner and outer sections by means of cylindrical partition walls 32a—37a respectively, which extend up from the bottom rings 32—37 to a sufficient extent to separate the concentrated fluid flowing down the inner wall of each chamber from the condensate of the vapor flowing down the outer wall thereof. This separation enables the concentrated fluid to be taken off through a series of pipes 32b—37b to suitable annular headers 52—57, here shown as being directly underneath the main body of the evaporator. The pipes 32b—37b extend up through the respective bottom rings 32—37 and are positioned inwardly of the baffles 32a—37a. Thus, the concentrated fluid drawn off is protected against dilution by the condensate from the vapors previously given off from that fluid. That condensate collects outwardly of the baffles 32a—37a and is taken off by another series of pipes 32c—37c which extend down into engagement with suitable annular headers 62—67 respectively.

In the embodiment here illustrated it is assumed that the evaporator is being used for the concentration of liquor in a pulp mill. Thus the product to be collected is concentrated liquor, here shown at 68 as collected in the tank 69. Such being the case, the condensate of the vapors evaporated off from the liquor is waste and may readily, after some economizing action, such as the use of it in heat exchangers where heating of other fluid is needed, be passed to the drain. In the system as illustrated, however, the heating effect from 14—19 will diminish in a direction outwardly from the center of the evaporator, so in order to achieve satisfactory evaporation from effect to effect, the pressure in the effects should diminish as the temperature goes down. Hence, different degrees of vacuum increasing from the innermost to the outermost of the effects need to be exerted in those effects. This is achieved by employing separate vacuum systems for the condensate for each of the series of pipes 32c—

37c. Only one of these is illustrated specifically, it being understood that they will all be of the same nature, though of different vacuum.

The specific illustration here referred to shows the pipe 62a connected to the header 62 at its upper end and to a condensate trap 70 at its lower end. This remover, in the form of a tank, has a bottom outlet pipe 70a for the run-off of the condensate, which pipe is controlled by a suitable valve 70b, preferably responsive to the level of condensate in the remover 70. From the upper end of the remover 70, a vent line 70c runs to a suitable vacuum source to give the desired vacuum in this effect. Flow through the line 70c is controlled by a suitable valve 70d. Each of the pipes 63a—67a, here shown as terminating just below their respective headers, will however lead into separate removers and vacuum and run-off systems, the same as that shown at 70—70d.

Reverting now to the collection of the product 68 in the tank 69, this is simply achieved by the use of pipes 52a—57a extending respectively from the headers 52—57 down through the top 71 of the tank 69 and well down towards the bottom of said tank. These legs, or pipes, and the height of the tank will be sufficient to enable the run-off of the product from the various effects regardless of the reduced pressures existing in such effects. Pressure differences are illustrated by the liquid levels 52d—57b in the respective pipes. The level of the liquid in the tank 68 need merely be at or above the level 52b of the fluid in the pipe 52. This level is controlled by drawing liquid off at 72 from the bottom of the tank 69 by means of a pump 73 as permitted by the valve 74 which in turn is controlled by the float 75 floating on the top of the liquid 68.

It is, of course, to be understood that if the evaporator is to be used for some such purpose as the evaporation of sea water to obtain fresh water therefrom, the product will be the condensate from the vapors given off as the sea water is evaporated. Then the remaining brine would be the waste to be disposed of. In other situations, of course, both the concentrated liquid and the condensate from the vapors could be useful products, with the evaporation means being employed for separation purposes.

As here shown, the chambers 14—19 are of uniform width. This, however, is not essential and the widths of the chambers can be varied if desired. What is essential, however, is that there be a uniform flow of liquid to be evaporated down the hotter wall of the effect. In particular, a certain minimum flow rate is required per foot of circumferential length of evaporation surface. As an illustration here, it has been found that for thin black liquor having substantially the same viscosity of water, a desirable flow rate is 200 pounds of water per foot of length on the circumference. If feed is increased in excess of this, there is some improvement in the heat transfer coefficient, but any advantage gained is rather counteracted by the increased power required for pumping. The pressure differential between the effects of an evaporator as shown in FIG. 1 need be no more than approximately two or three pounds, assuming that the system starts from atmospheric pressure. Of course, the pressure difference may well vary from effect to effect.

From the embodiment of the invention illustrated in FIG. 1, it will be readily apparent that it lends itself to the cleaning off of any encrustation in simple manner. All that needs to be done is to change over the feed in the pipe 40 to water and flow the water down the convex walls in order to clean off any encrustation. Also it will be apaprent that by removing the shell 25 additional effects may be added to or subtracted from an evaporator so made at any time that may be desired.

A slightly modified form of the invention is illustrated in FIG. 3. Here the central heating chamber and associated parts are substantially the same as those illustrated in FIG. 1, so carry the same reference characters as similar parts in FIG. 1 with the letter "a" added thereto. Hence the main chamber, generally takes the reference character "1a" etc. This center heating chamber is again surrounded by a series of concentric cylindrical annular chambers extending outwardly therefrom, as illustrated at 80–85 inclusive. The chambers 80 and 81 have outer cylindrical walls 86 and 87 substantially the same as the walls 20 and 21 in FIG. 1. One difference here, however, is that the wall 86 extends up above its top closing ring in a portion 86a in opposition to the similarly upwardly extending portion 2b of the wall 2a. This provides an annular tank, here shown as open to the atmosphere, above the closing ring 88 to contain the supply liquor to be concentrated in the chamber or effect 80.

The walls 89—91 are shown as corrugated horizontally. This formation, as will be readily apparent, provides a greater surface area down which the film of liquid to be concentrated flows in the course of the evaporation. Also, this adds strength to the walls, though in a construction where all of the heat exchange walls of the evaporator are concentric spaced cylinders, and where the pressure differential from effect to effect is low, generally in the neighborhood of 2 to 3 pounds, corrugation is hardly necessary. It is also to be understood that although walls 86 and 87 are here shown as straight, while 89, 90 and 91 are corrugated, this is only for illustrative purposes and all, or any number of them, could be corrugated or not as desired.

The outer wall 92 of chamber 85, like the outer wall 25, of chamber 19 in the FIG. 1 form, being the shell of the whole construction, is heavier than the interior walls, for, again, it forms the principal support for the structure. Preferably also it is jacketed for cooling purposes like the wall 25.

The upper ends of the chambers 81—85 are closed respectively by suitable rings 93—97. The wall 89 extends up above the rings 94 and 95 in a portion 89a and serves, in conjunction with the upper surfaces of the rings 93 and 94 and the wall portion 86a, to form an annular fluid tank 99. This surrounds the tank 98 above the ring 88. The upward extension 89a also forms a wall of the outer tank 100 bordered by the upper surfaces of the rings 95, 96 and 97 and the upward extension 92a of the wall 92.

The tank 98 communicates through a single nozzle 88a with the interior of the chamber 80. This nozzle is shown as having a restricted orifice 88b for the flow of liquid from the tank 98a onto the outer surface of the wall 2a. The tank 99 overlying both of the chambers 81 and 82 communicates with the first thereof by means of the nozzle 93a and with the second thereof by means of the nozzle 94a. In this instance, the nozzles are shown as having restricted orifices 93b and 94b. Similarly, the tank 100 communicates with the chambers 83, 84 and 85 by nozzles 95a, 96a, 97a. These in turn are equipped with restricted orifices 95b, 96b, 97b.

The purpose of providing restricted orifices is in order to achieve uniform flow of fluid onto the evaporating wall surfaces, having in mind that the tanks 98, 99 and 100 are open to atmosphere, whereas the interiors of the chambers 80—85 are subjected to graduated decrease in pressure from the innermost to the outermost of these chambers. Thus the orifices would need to be restricted accordingly to provide for uniform flow. Means other than different orifices may be provided to achieve this uniformity, it being understood that the restriction of the orifices is illustrative of one manner of producing the desired flow.

The bottoms of the chambers 80—85 are closed by rings 80a—85a respectively. These carry upstanding annular partitions 80b—85b respectively. Again, a series of pipes takes off the concentrated liquor from the bottom of the convex sides of the respective walls 2a and 86—91 and runs that liquor into annular headers from whence it is drawn off by a series of pipes 101—106. Concentrated liquor drawn off from the outer effects is returned to the inner effects so that the final product is taken off from the innermost effect.

To begin with, the feed for the tank 100 is pumped up through the pipe 107 by means of the pump 108 under the control of the valve 109. Then the concentrated liquor drawn off from the bottom of the effects, 83, 84 and 85 through the pipes 104, 105 and 106 is brought together in a pipe 110 and returned by means of the pump 111 through that pipe to the top of the evaporator where it is introduced into the tank 99. This tank provides the feed for the chambers or effects 81 and 82 and the concentrated liquor drawn from these effects through the pipes 102 and 103 is likewise brought together in and returned through a pipe 112 by means of the pump 113 to the tank 98. This tank provides the feed for the innermost chamber 80 where the heat and pressure are at their highest. The final product is thus drawn off from the pipe 101 by means of the pump 113 and collected as desired.

The condensate from each of the chambers 80—85 is collected in the same manner and is here shown as being collected and drawn off in the same manner as is the case in the FIG. 1 showing. In other words, the pipe 115 from the header receiving condensate from chamber 80 takes that condensate to a remover 116 whose liquid level 117 is controlled by a valve 118 in the run off line from the bottom of the remover, which valve is in turn controlled by a valve in the bottom of the remover. The vent line 119 from the top of the remover is connected to a suitable vacuum source through a control valve 120. The same is also true individually with respect to the condensate pipes 121, 122, 123, 124 and 125, here shown as broken off below their respective headers.

The particular series arrangement of returning concentrated liquor from the outer effects inwardly towards the inner final effect is merely illustrative of one possibility for the operation of an evaporator in accordance with the invention. This illustration is of a part series and part parallel arrangement. A full series arrangement could be employed where each effect from the outermost inward returns its condensed liquor to the next inner effect. A full parallel one is shown in FIG. 1 and, of course, various combinations of series and parallel arrangements could be employed. Furthermore series or combination arrangements could be set up to work in reverse to those here shown. In other words concentrate from inner effects could be removed and reintroduced into outer ones.

Under certain conditions, separation of concentrated liquor from vapor and the condensate thereof, to a greater extent than provided by the partitions such as 32a in FIG. 1, is desired. Various manners of achieving this end are illustrated in FIGS. 4, 5 and 6. In FIG. 4, an effect having heat transmissive walls 125 and 126 is shown as having a perforated screen 127 disposed throughout the height thereof. This screen, of course, is cylindrical in form and extends around the full cylinder of the chamber 128. The screen is suitably maintained in desired spaced position with respect to the walls 125 and 126 by suitable spacer members 129 and 130 extending from the wall 125. Preferably the screen is secured to the ends of these spacer members. It is, of course, to be understood that the circumferential extent of the spacer members should be small to minimize any interference with the flow of the film of liquor down to the wall.

A frusto-conical baffle arrangement is illustrated in FIG. 5. Here a series of such conical sections is employed as needed throughout the height of the effect. The walls 135 and 136 of the effect are spaced apart by the ring members 137 and 138. The upper conical baffle member 139 commences at substantially the mid-point of the ring 137 and terminates after extending part way down and part way towards the wall 135. Adjacent its lower end it is spaced from that wall by spacer members 140. In turn on its other side it carries spacer members 141 to support the commencement of the next conical member 142. This arrangement progresses throughout the height of the effect. In this form vapors driven off from the fluid on the wall at 135 must flow down around the lower end of the opposed baffle and up through the spaces such as 143 provided between the overlapping termination of the first baffle and commencement of the next. Then when the vapors reach the opposite wall 136 they condense and flow down along it, fully isolated from the fluid flowing down the wall 135.

The baffle arrangement in FIG. 6 merely employs a single cylindrical member 145 commencing in engagement with the spacer ring 146 at the upper end of the effect and extending to a position 147 closely adjacent the bottom spacer ring 148 and in overlapping relation with respect to the partition member 149 extending up from the ring 148. The baffle 145 and partition 149 are, however, spaced apart to a substantial extent at 150 where they overlap. The space 150 is the only space through which vapor given off from the vaporized fluid can flow into the section of the chamber on the right hand side of the baffles 145 and 149 where it is to condense. This is believed to be the most efficient of the baffle arrangements of FIGS. 4–6. To get sufficient free volume for separation in those situations where the liquor has a tendency to form, it is desirable to increase the spacing between the cylindrical walls of the effect when using this baffle.

FIG. 7 shows a fragmentary section illustrating a manner of assembly particularly adaptable when light gauge metal, canvas, or soft material is to be used for the cylinder walls. The supporting shell 155 in this instance has a conically opening top portion 156 and a conically inwardly inclined lower portion 157. This formation of the shell with mated formation of rings and cylinders received therein facilitates the assembly of the evaporator out of the materials indicated and without the necessity of any welding.

First the inner surface of the shell 155 is preferably provided with a corrosion resistant coating 158. The top rings 159, 160 and 161 and the bottom rings 162, 163 and 164, have their side surfaces conically formed so that the bottom ring 162 can be slid down the shell until it reaches the bottom thereof when it is stopped by the inward incline of the shell at 157 and the bottom inturned lip thereof 165. This ring is suitably gasketed at 166 to make a tight joint with the outer shell. Then the upper ring 159 is assembled with the cylindrical wall member 166 and they are set in place with the lower portion of that wall member at 167 engaging the outer conical surface of the ring member 162. The ring member 162, like the shell 157, has an inturned bottom lip 168 which serves to receive the inturned lower end of the wall 166.

The top ring 159 slides down on the conical surface at the mouth of the shell and is gasketed against it at 169. On its inner surface the ring 159 is also gasketed at 170, which gasketing is engaged with the outwardly conically formed portion 171 of the wall 166. Once the wall 166 is so positioned in the shell, the next bottom ring 163 carrying a gasket 172 is seated in place to secure the wall 166 by means of the lower end 167. Next the upper ring 160 is applied. It has an outturned lip 173 which overlies the outturned upper end of the cylindrical wall member 166. From there on the assembly continues with the application of the desired number of cylindrical wall members and rings for holding the same until the desired number of effects is provided and the center heating cylinder is established.

As previously indicated, this manner of constructing the heat exchanger enables various light weight materials to be employed for the heat exchange walls. The ring members may be provided in sections rather than as complete rings, and no welding is required in the assembling. Thus the exchanger may be shipped knocked down and the assembly effected at the place where it is to be used.

Alternative arrangements for cooling the shell wall, or condensing the vapors within the last effect, are illustrated in FIGS. 8-11. Here the shell wall and the adjacent concentric wall being the same as those in FIG. 1, they carry the reference characters 25 and 24, respectively, while the effect in each instance carries the reference character 19.

In the form of FIG. 8, the wall 25 is jacketed interiorly, but in this instance by helically arranged piping 175. This continuous helical jacketing has an inlet 176 at its upper end and an outlet 177 at its lower end. Like the jacket 25b of FIG. 1, the helical piping extends throughout a substantial portion of the height of the shell 25.

In FIG. 9, an exterior annular jacket 178 is applied to the wall 25 with suitable inlet and outlet connections such as the upper one, 179 and the lower one, 180.

FIG. 10 differs from this in that the exterior jacket is horizontally divided into two parts, 181 and 182. These parts may be completely separate shells, or may be a single shell separated into parts by the horizontal spacer 183. In any event, the upper jacket part 181 has an inlet at 184 and an outlet at 185, while the lower jacket has its inlet and outlet conduits at 186 and 187. Thus coolants differing in temperature, or other characteristics, may be employed in the separate jacket parts. Furthermore, the flow of the cooling fluid may be reversed in either one or both of them.

In FIG. 11 direct cooling is effected by the introduction of water or other suitable cooling medium against the inner surface of the wall 25 through pipes 190 having nozzles 191 directing the flow against the surface. A sufficient number of these will be provided around the periphery to furnish sufficient flow of water for complete condensation of the vapors.

A somewhat different arrangement is illustrated in FIG. 12. Here, instead of condensing the vapors in the last effect, they are removed in vapor form, passed through a separator, advantageously of the cyclone type, compressed and employed for the initial heating medium in the center cylinder. The outer shell here may be cylindrical, as illustrated at 25 in FIG. 1. It may also, as shown in FIG. 12, be conical, enlarging in its upward extent as indicated at 192. The outlet for the vapor at 193 is adjacent the upper part of this conical wall and the vapor passes therefrom into the separator 194. Vapor remaining after the separation passes through the pipe 195 into the compressor 196 where it is heated and caused to flow through the pipe 197 into the center heating chamber 1. Steam, or other additional heating medium, may be added through the pipe 198 to join with the compressed vapors from the pipe 197 in the inlet pipe 199. The evaporator is thus caused to work on the thermo-pressure principle. It will be appreciated that the invention evaporator is vastly superior to any prior art multiple effect evaporator worked according to that principle, as the practically total absence of throttling losses between the effects calls for a minimum of compression ratio and compression work.

From the foregoing illustrative embodiments of the invention it will be apparent that applicant has devised a novel multi effect evaporator which, though greatly simplified in construction, is nevertheless highly efficient in operation and in fact has been found to give results surprisingly superior to those that were anticipated by calculation. It will be clear to those skilled in the art that the setting forth of said embodiments is by way of illustration and is in no sense limiting of the possible variations and modifications that may be adopted in applying the invention. It is, accordingly, to be understood that modifications and variations of the structure of the invention as shown and described can be made without departing from the spirit or scope thereof as set forth in the claims to follow.

Having described my invention, what I claim as new and desire to secure by Letters Patent is:

1. In evaporator construction, a pair of concentric horizontally spaced vertically extending cylinders providing opposed cylindrical walls, one of said cylinders being formed of heat transmissive material, means for closing the space between said cylindrical walls at the top end thereof, means for closing the space between said cylindrical walls at the bottom end thereof, means for introducing feed through said top end closing means, means for removing condensate and means for removing concentrate through said bottom end closing means, and baffle means within said space concentric with respect to said walls, in spaced relation with respect thereto, the lowermost portion of said baffle means being imperforate, positioned between said condensate removing means and said concentrate removing means and being sealed to said means for closing said space at the bottom end of said cylindrical walls, said baffle means extending throughout the vertical extent of said space, and said baffle means, above said lowermost portion thereof, being formed with passage means therethrough so that vapor can pass through the baffle means from one side to be condensed on the other side.

2. Evaporator construction as in claim 1 and said baffle means including a perforated screen.

3. Evaporator construction as in claim 1 and said baffle means including overlapping frusto-conical sections and means for spacing said sections apart where they overlap.

4. Evaporator means as in claim 1 and said baffle means including laterally spaced concentric overlapping cylinders, each having a vertical extent less than the height of said walls.

References Cited in the file of this patent

UNITED STATES PATENTS

| | | |
|---|---|---|
| 945,640 | Thelen et al. | Jan. 4, 1910 |
| 1,942,858 | Hickman | Jan. 9, 1934 |
| 2,076,498 | Farwell | Apr. 6, 1937 |
| 2,159,303 | Waterman et al. | May 23, 1939 |
| 2,764,233 | Skinner | Sept. 25, 1956 |
| 2,769,489 | Eckstrom | Nov. 6, 1956 |

FOREIGN PATENTS

| | | |
|---|---|---|
| 144,631 | Great Britain | May 5, 1921 |